Figure 1:
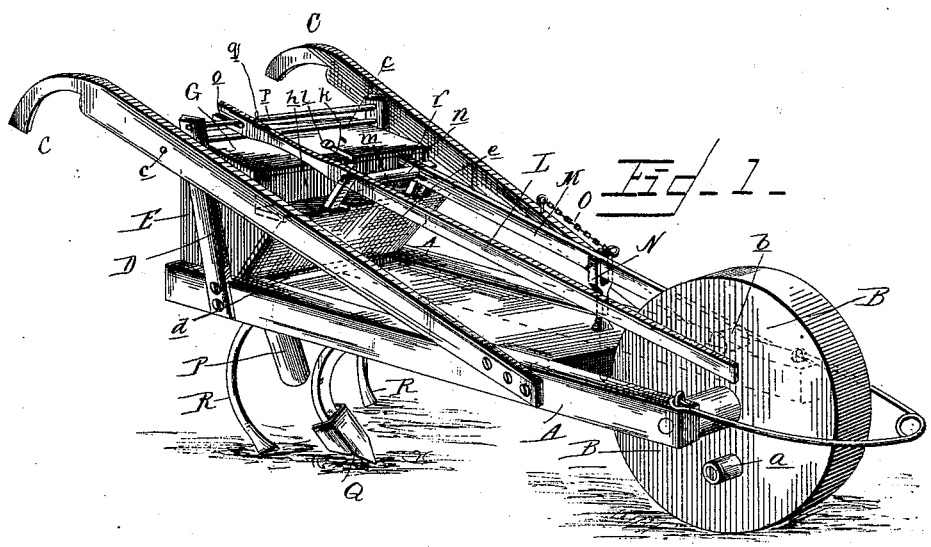

(No Model.)

J. P. BIRMINGHAM.
CORN AND FERTILIZER DROPPER.

No. 411,005. Patented Sept. 17, 1889.

Witnesses

Inventor
John P. Birmingham
by his Attorney
Franklin H. Hough

UNITED STATES PATENT OFFICE.

JOHN P. BIRMINGHAM, OF LEXINGTON, VIRGINIA, ASSIGNOR OF ONE-HALF TO ANDREW T. STATON, OF SAME PLACE.

CORN AND FERTILIZER DROPPER.

SPECIFICATION forming part of Letters Patent No. 411,005, dated September 17, 1889.

Application filed June 17, 1889. Serial No. 314,523. (No model.)

*To all whom it may concern:*

Be it known that I, JOHN P. BIRMINGHAM, a citizen of the United States, residing at Lexington, in the county of Rockbridge and State of Virginia, have invented certain new and useful Improvements in Corn and Fertilizer Droppers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in corn and fertilizer droppers, and it has for its object to provide a device of this character that shall be simple and very effectual in its operation, providing for the dropping of the fertilizer and seed alternately.

It aims, also, at other improvements in the construction, as will hereinafter be made more apparent.

The invention consists in the peculiar combinations and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 2:
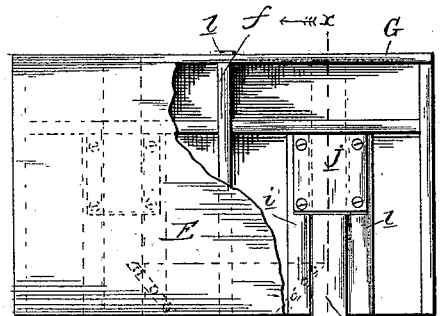
Figure 3:
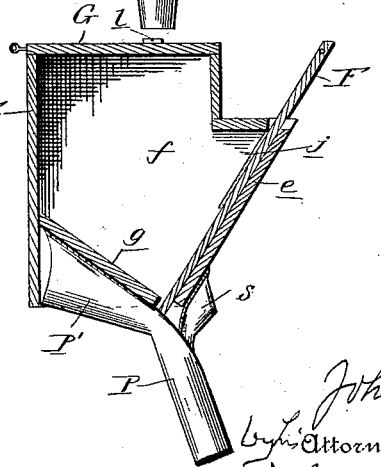

Figure 1 is a perspective view of a seeder constructed in accordance with my invention. Fig. 2 is a rear view of the hopper with parts broken away, showing the slides and their connections. Fig. 3 is a vertical section through the line $x$ $x$ of Fig. 2.

Like letters of reference indicate like parts throughout the several views where they occur.

Referring now to the details of the drawings by letter, A designates the main frame, which may be constructed in any well-known manner and of material best suited to the purpose. In the forward end of the frame is journaled the wheel B, which is provided upon opposite sides with the lugs or projections $a$ and $b$, the lug $a$ being substantially diametrically opposite the lug $b$, as shown, so that while one lug is operative the other will be inoperative, so as to actuate the dropper-slides at different intervals instead of simultaneously.

C C are the handles, secured at their forward ends to the side bars of the frame and near their rear ends secured to the upper ends of the uprights or standards D, which at their lower ends are secured to the side bars of the frame near the rear ends thereof. The rear ends of the handles are connected to the said standards preferably by means of the transverse shaft $c$, so that the handles may be readily put on or taken off in case of breakage or for other purposes.

E is the hopper or feed-box secured to the side bars of the frame, the rear ends of which project behind the platform, leaving a space $d$, above which the bottom of the hopper is located. This hopper is formed with a rearwardly-inclined front side $e$, a central partition $f$, and a forwardly-inclined bottom $g$, which is secured to the rear side of the hopper within the same, as shown. The front end or side of the hopper is formed with a ledge $h$, and through this ledge or through the front corner of the hopper work the slides F, which work in guides $i$, secured to the inner face of the inclined front side of the box, as shown, a metallic plate $j$ being secured across the guides, near the upper end thereof, to prevent the seed from getting in between the guides and preventing the operation of the slides. These slides pass through openings in the bottom of the hopper, as will be readily understood.

The hopper is provided with a suitable removable cover G, provided with a slot $k$, designed to engage a screw or analogous device $l$ on the partition of the hopper, so that by sliding the cover on it will be held from vertical displacement by means of the head of the screw engaging the top of the cover. The upper ends of the slides are connected by the transverse rod or bar $m$, on which is the sleeve or roller $n$, designed to separate the levers which actuate the slides, soon to be described.

L is a lever or arm, the forward and free end of which extends by the side of the wheel B in the path of the lug *a* on said wheel. The other end of this lever is formed with an open-ended slot *o*, which is engaged by the transverse rod or shaft *p*, which connects the upper ends of the standards D, and is prevented from side movement by means of the pin *q*, passed through the shaft, so as to keep the free end of the lever against the wheel in the path of the lug. This lever is connected between its ends to the rod *m*, as shown.

M is a lever, the free or forward end of which is arranged close to the opposite side of the wheel B and in the path of the lug *b* thereon, the opposite end of this lever being provided with an elongated slot *r*, through which the bar *m* passes, the said lever being pivotally connected between its ends to the bifurcated arm N, which has its lower end loosely fitted in a hole or socket in the platform, as shown. The pin which forms the connection between this lever and the arm is made removable and is held by a chain or cord O, which is attached to the side bar of the frame so as to prevent loss of said pin.

To the bottom of the rear side of the hopper is attached a spout P, provided with the concaved spread-out attaching portion *p'*, through the corners of which the attaching-screws or other fastening means pass. This portion *p'* extends beneath the openings in the bottom of the hopper, so that whatever falls through said holes will be conducted into the spout, the discharge end of which is arranged just to the rear of the shovel or plow Q, the shank of which is attached to the platform in any well-known manner.

R are the coverers, arranged one upon each side of the plow and spout, and attached to the platform in any suitable manner.

S is a guard placed within the mouth of the spout and serving to prevent waste of the seed and fertilizer as they are dropped from the hopper into the spout.

The operation is simple and apparent. In the forward movement of the device the revolution of the wheel B first causes the free end of the lever L to raise by reason of the engagement of the lug *a* therewith. This allows the fertilizer to drop through the hole in the bottom of the hopper into the spout, where it falls behind the plow. The same movement raises the slide in the seed-compartment of the hopper and allows the seed to fall into the spout on top of the fertilizer. In the further revolution of the wheel B, the lug *b* comes in contact with the free end of the lever M, and, throwing it up, throws down the two slides and stops the flow of fertilizer and seed until the lever L is again raised by the lug *a* to raise the slides and allow the fertilizer and seed to again drop.

What I claim as new is—

1. The combination with the frame and the bifurcated arm N, fitting a socket in the platform on said frame, of the wheel B, having a lateral lug, the lever M, the slide carried thereby, the removable pin connecting said lever and arm N, and the cord O, connecting said pin with the side bar of the frame, substantially as described.

2. The combination, with the frame, the wheel, and the slide, of the transverse bar *m*, connecting said slides, the levers L M, the latter formed with elongated slot *r*, through which said bar *m* passes, and the former with an open-ended slot O, the standards, and the transverse rods *b*, connecting the upper ends of said standards and engaging the slot *o* of the lever L, and provided with a step *q*, substantially as shown and described, and for the purpose specified.

3. The combination, with the hopper, the slides working vertically in guides therein, the wheel B, having the lugs upon opposite sides thereof, the transverse bar *m*, connecting the upper ends of the slides, and the roller *n* on said bar between the slides, of the standards, transverse bar *p*, connecting the upper ends thereof, the lever having its free end arranged in the path of one of the lugs on the wheel, and its other end bifurcated and engaging the bar connecting the standards, and connected with the bar connecting the slides, and the lever having its free end arranged in the path of the other lug on the wheel, and having its rear end slotted and engaging the bar connecting the slides, and a support for the said lever between its ends, substantially as shown and described.

In testimony whereof I affix my signature in presence of two witnesses.

JNO. P. BIRMINGHAM.

Witnesses:
J. P. MOORE,
T. E. MCCORKLE.